(12) United States Patent
Carlin et al.

(10) Patent No.: US 6,556,828 B1
(45) Date of Patent: Apr. 29, 2003

(54) NETWORK ARCHITECTURES FOR LEO/ GEO SATELLITE-BASED COMMUNICATIONS SYSTEMS

(75) Inventors: James W. Carlin, Holmdel, NJ (US); Robert A. Hedinger, Red Bank, NJ (US); Robert E. Schroeder, Branchburg, NJ (US)

(73) Assignee: Loral SpaceCom Corp., New York, NY (US)

( * ) Notice: Subject to any disclaimer, the term of this patent is extended or adjusted under 35 U.S.C. 154(b) by 0 days.

(21) Appl. No.: 09/386,268

(22) Filed: Aug. 31, 1999

(51) Int. Cl.[7] .................................................. H04Q 7/22
(52) U.S. Cl. ........................ 455/427; 455/12.1; 370/319
(58) Field of Search ................................. 370/279, 342, 370/319, 442, 320, 315, 316, 441; 455/12.1, 90, 427, 550

(56) References Cited

U.S. PATENT DOCUMENTS

| | | | |
|---|---|---|---|
| 5,822,680 A | * 10/1998 | Stuart et al. | 455/12.1 |
| 5,887,257 A | * 3/1999 | Olds | 455/427 |
| 5,896,558 A | * 4/1999 | Wiedeman | 455/12.1 |
| 5,907,541 A | * 5/1999 | Fairholm et al. | 370/316 |
| 6,088,571 A | * 7/2000 | Kane et al. | 455/12.1 |
| 6,198,730 B1 | * 3/2001 | Hogberg et al. | 370/320 |

* cited by examiner

*Primary Examiner*—Quochien Vuong
(74) *Attorney, Agent, or Firm*—Kenneth W. Float

(57) ABSTRACT

Communications network architectures integrate communications using a geosynchronous satellite communications system including a geosynchronous communications satellite operating in the fixed satellite service (FSS) band and a low earth orbit satellite communications system including a plurality of low earth orbit communications satellites. A low earth orbit gateway having a terminal is used to communicate with the low earth orbit communications satellites using multiple access communication channels, and is used to communicate with a public switch telephone network. A geosynchronous gateway having a terminal is used to communicate with the geosynchronous communications satellite by overlaying multiple access communication channels onto fixed channel assignments and transmitting the overlayed channel assignments. The terminal in the geosynchronous gateway is also used to communicate with the public switch telephone network. A fixed terminal having a handset is used to selectively communicate with the low earth orbit communications satellite using the multiple access communication channels, and with the geosynchronous communications satellite by extracting the multiple access communication channels from the fixed channel assignments.

12 Claims, 4 Drawing Sheets

NETWORK ARCHITECTURES FOR LEO/GEO SATELLITE-BASED COMMUNICATIONS SYSTEMS

BACKGROUND

The present invention relates generally to satellite-based communication systems, and more particularly, to network architectures that provide for a low earth orbit and geosynchronous orbit satellite-based communications systems.

Currently, there are geosynchronous orbit satellite communication systems such as the Brazilsat system, for example, that provide fixed wide area communication (telephony) services. There are also low earth orbit satellite communication systems such as the GlobalStar and Iridium systems, for example, that provide mobile communication (telephony) services. However, heretofore, the fixed and mobile systems have not been coupled together to provide an integrated system. The present invention addresses this issue.

Accordingly, it is an objective of the present invention to provide for network architectures for low earth orbit and geosynchronous orbit satellite-based communications systems.

SUMMARY OF THE INVENTION

To accomplish the above and other objectives, the present invention is network architectures that provide telephony service for fixed and mobile satellite ground terminals using code division multiple access (COMA) access technology. The network architectures were developed to provide telephone service in areas of the earth that have relatively little or no land-based communication infrastructure, such as underdeveloped rural areas, for example.

The communications network architectures comprise a geosynchronous satellite operating in the fixed satellite service (FSS) band communications system including a geosynchronous communications satellite and a low earth orbit satellite communications system including a plurality of low earth orbit communications satellites. A low earth orbit gateway comprising a terminal is used to communicate with the low earth orbit communications satellites using multiple access communication channels. A geosynchronous gateway comprising a terminal is used to communicate with the geosynchronous communications satellite by overlaying multiple access communication channels onto fixed channel assignments and transmitting the overlayed channel assignments. The terminals in the geosynchronous and low earth orbit gateways communicate with a public switch telephone network (PST). A fixed terminal having a handset is used to selectively communicate with the low earth orbit communications satellite using the multiple access communication channels, or with the geosynchronous communications satellite by extracting the multiple access communication channels from the fixed channel assignments.

The LEO gateway communicates by way of the low earth orbit communications satellites to fixed terminals located at low telephone density sites or that can be part of a clustered village phone systems, for example. The LEO satellite communications system also has mobile terminals that are used by individuals in vehicles. The mobile terminals typically interface to the LEO communications satellites and to cellular sites in high telephone density areas. Thus, the mobile terminals may be used in both low and high telephone density areas. The mobile terminals interface by way of the cellular sites or LEO communications satellites and LEO gateway to the public switch telephone network.

Each communication site in the low telephone density areas has a fixed terminal and a public use handset that are used to communicate with both the geosynchronous communications satellite and the LEO communications satellites. Each clustered village phone system has a very small aperture terminal (VAST) that is coupled to either a wired or wireless loop interconnecting a plurality of conventional telephones. The very small aperture terminal also has a public use handset for backup purposes, in case of failure of the wired or wireless loops.

The present invention preferably uses code division multiple access (CDMA) communication technology in the fixed satellite service (FSS) band. The CDMA technology allows the fixed terminals to communicate with both the geosynchronous and LEO communications satellites. The present invention preferably uses GlobalStar terminals, handsets and gateway technology in conjunction with the fixed satellite service geosynchronous satellite to provide rural telephony. Thus, the capabilities of the GlobalStar system are expanded by the present invention to support fixed satellite service telephony traffic.

The present invention provides for a shared GEO and LEO telephony service gateway. The present invention uses low cost fixed and mobile satellite terminals. The architecture of the present invention provides for a scalable telephony solution that allows from one to several hundred users per clustered village terminal.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
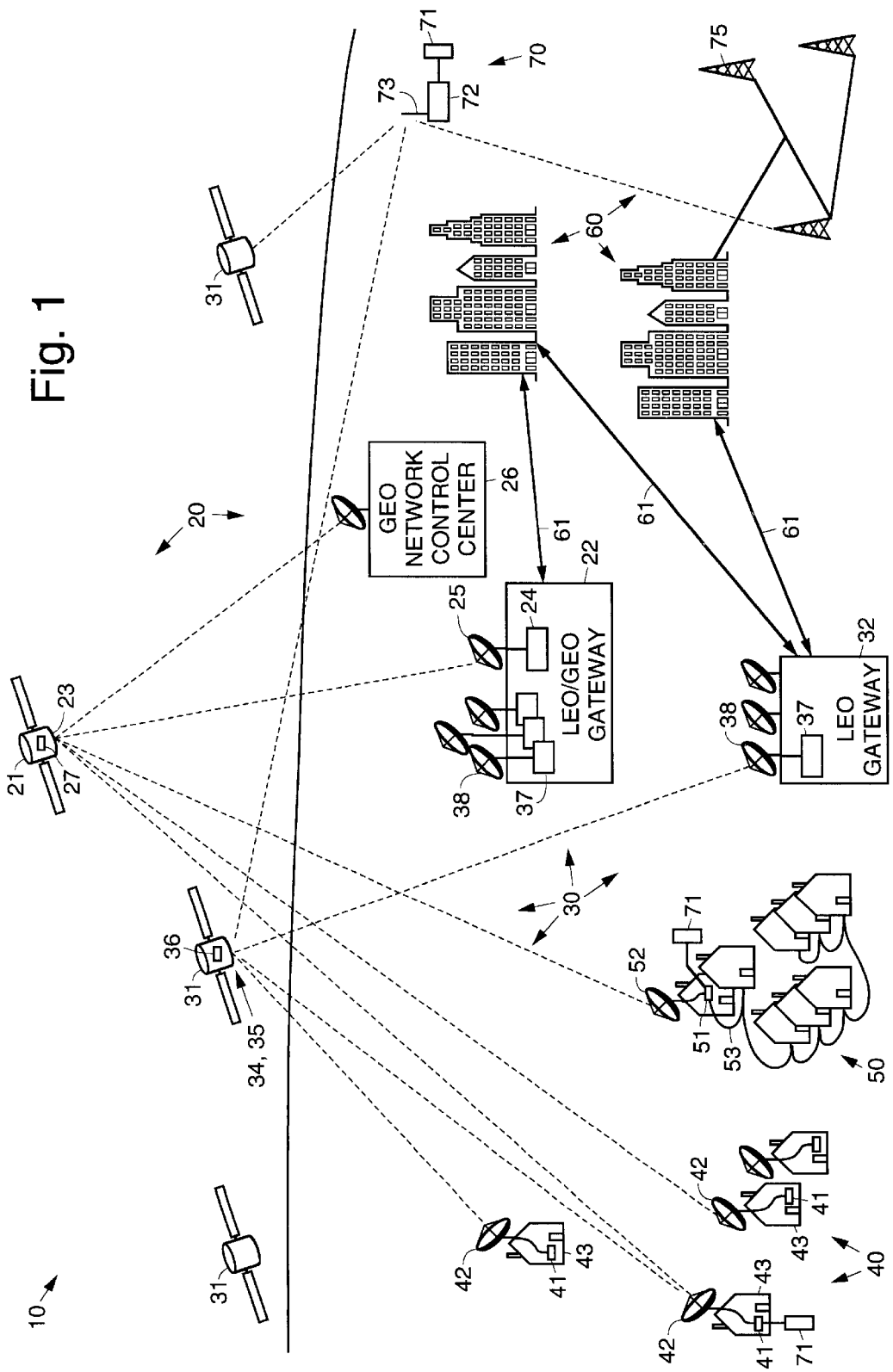
FIG. 1 illustrates an exemplary hybrid communications network architecture in accordance with the principles of the present invention.

Referring to the drawing figures, FIG. 1 illustrates an exemplary hybrid communications network architecture 10 in accordance with the principles of the present invention. The hybrid communications network architecture 10 provides for system that permits communication between fixed and mobile users using geosynchronous (GEO) and low earth orbit (LEO) communications satellites 21, 31. The hybrid network architecture 10 implements a system that provides communication (telephony) service by way of the geosynchronous and low earth orbit communications satellites 21, 31 to fixed and mobile user terminals 41, 51, 72 using code division multiple access (CDMA) access technology, for example.

More particularly, the network architecture 10 comprises a geosynchronous satellite communications system 20 including a geosynchronous communications satellite 21 and a geosynchronous satellite network control center 26. The geosynchronous satellite network control center 26 controls the operation of the geosynchronous communications satellite 21.

The hybrid network architecture 10 also comprises a low earth orbit satellite communications system 30, such as the GlobalStar system developed by the assignee of the present invention, which includes a plurality of low earth orbit communications satellites 31. Communication with the geosynchronous communications satellite 21 is provided by a low earth orbit/geosynchronous (LEO/GEO) gateway 22. Communication with the low earth orbit communications satellites 31 is provided by a low earth orbit (LEO) gateway 32.

Although two separate gateways 22, 32 are shown in FIG. 1, it is to be understood that a single gateway 22 containing the components of both the LEO/GEO and LEO gateways 22, 32 may be provided to implement the present invention. As such, the specific implementation shown in FIG. 1 should not be taken as limiting the scope of the present invention.

The LEO/GEO gateway 22 comprises a C-band terminal 24 and antenna 25 that communicates with a C-band antenna 23 and transponder 27 on the geosynchronous communications satellite 21. The C-band terminal 24 interfaces by way of a public switch telephone network interface 61 to a public switch telephone network. The public switch telephone network is the land based telephone communications infrastructure provided by local telephone companies that are typically used in high telephone density areas. The LEO/GEO gateway 22 also communicates by way of a public switch telephone network (PST) interface 61 to the public switch telephone network.

Each low earth orbit communications satellite 31 comprises L- and S-band antennas 34, 35 for communicating with fixed user terminals 41 having a handset 71 and vehicle-mounted mobile terminals 72 having a mobile handset 71. Transponders 36 onboard each satellite 31 transmit data in the L-, and S-bands.

The LEO gateway 32 comprises an L/S-band terminal 37 and antenna 38 that interfaces between the low earth orbit communications satellites 31 and the public switch telephone network. The L-band is used to communicate from the fixed terminals 41 and mobile terminals 72 to the low earth orbit communications satellites 31. The S-band is used to communicate from the low earth orbit communications satellites 31 to the fixed terminals 41 and mobile terminals 72.

Exemplary L- and S-band links used in the GlobalStar system are 1610–1626.5 MHz (terminal 41 to LEO satellite 31) and 2483.5–2500 MHz (LEO satellite 31 to terminal 41). Exemplary C-band links arc 5091–5250 MHz (gateway 22 to GEO satellite 21), and 6875–7055 MHz (GEO satellite 21 to gateway 22).

The satellite antenna configuration used in the GlobalStar system (L- and S-bands), for example, typically provides for a 16 beam fixed array. The antenna 73 employed in the mobile terminals 72 at mobile sites is an omnidirectional antenna 73, and the antenna 42 used at the fixed sites 43, 53 is a switched-directional array. The antenna 38 in the LEO gateway 32 is a tracking antenna, for tracking the low earth orbit communications satellites 31.

The geosynchonous communications satellite 21 comprises a C-handle antenna 23 and transponder 27 or communicating between the LEO/GEO gateway 22 and C-band very small aperature terminal; (VAST) 51, via VAST antenna 52, and between the LEO/GEO gateway 22 and fixed terminals 41 located at low telephone density sites 40, and clustered village phone systems 50. The LEO/GEO gateway 22 comprises at C-band terminal 24 that communicates with the C-band antenna 23 and transponder 27 onboard the geosynchronous communications satellite 21. The C-band terminal 24 at the LEO/GEO gateway 22 also interfaces to the public switch telephone network. The LEO/GEO gateway 22 may also comprise L/S-band terminals 37 and antennas 38 for communicating with the LEO satellite 31.

The LEO/GEO gateway 22 and LEO gateway 32 interconnects the geosynchronous and low earth orbit satellite based wireless networks and a public land mobile network (PLMN), such as Advanced Mobile Phone Service(AMPS) or Groupe Speciale MobileGSM), of the public switch telephone network. As such, the gateways 22, 32 provide a termination point for network transmission and network signaling. The gateways 22, 32 may be connected to the public switch telephone network using a standard E1/T1 trunk supporting a variety of signaling protocols. To GSM networks, the gateways 22, 32 appear as a GSM base station subsystem. To mobile switches in an EIA/TIA environment, the gateways 22, 32 appear as another mobile switch supporting the IS-41 Intersystem Operation Standard. Furthermore, the mobile terminals 72 are dual- or multi-mode terminals, and are compatible with AMPS, IS-95, and GSM standards.

Figure 2:
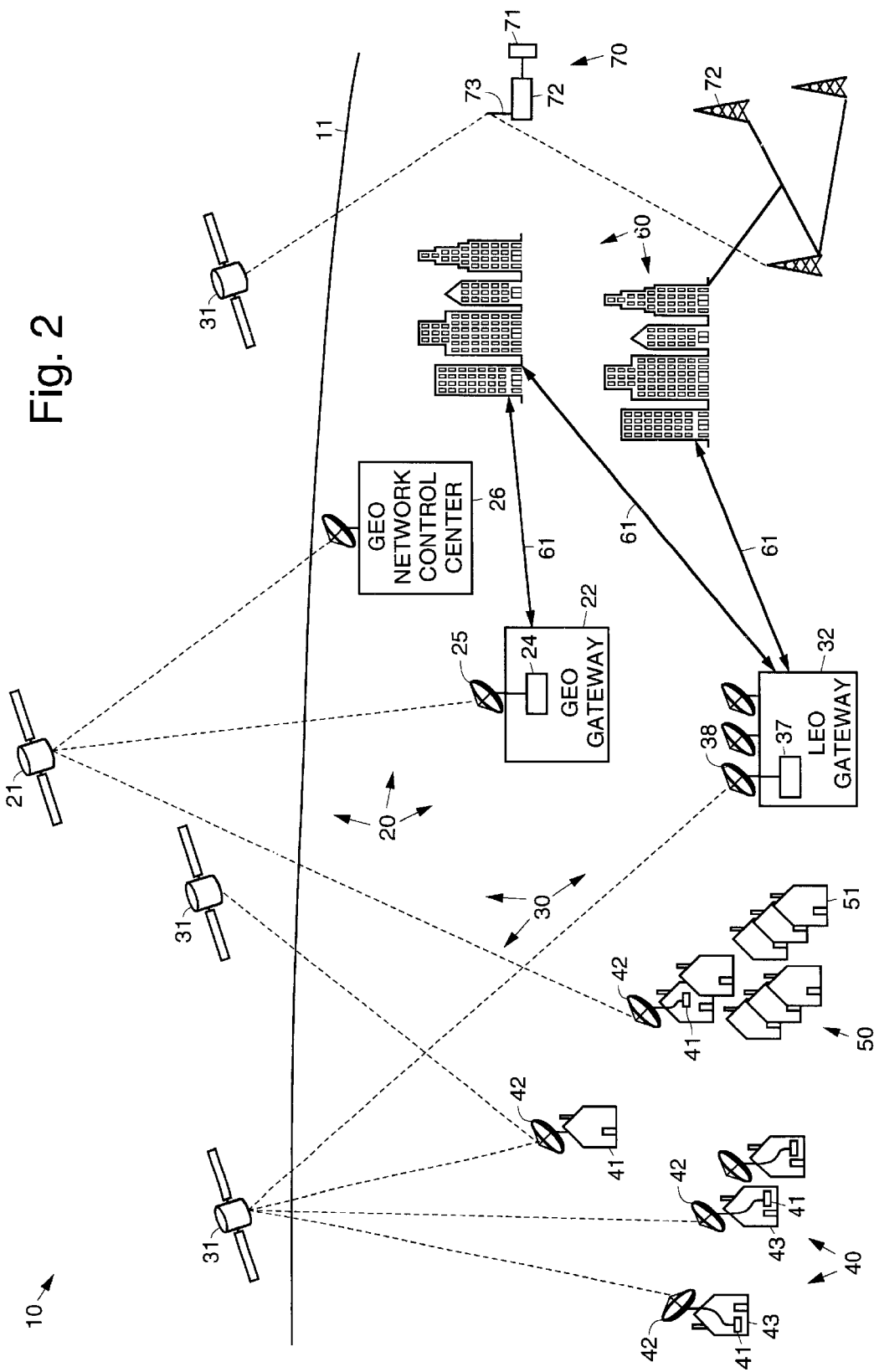
FIG. 2 illustrates an exemplary complementary communications network architecture in accordance with the principles of the present invention.
Figure 3:
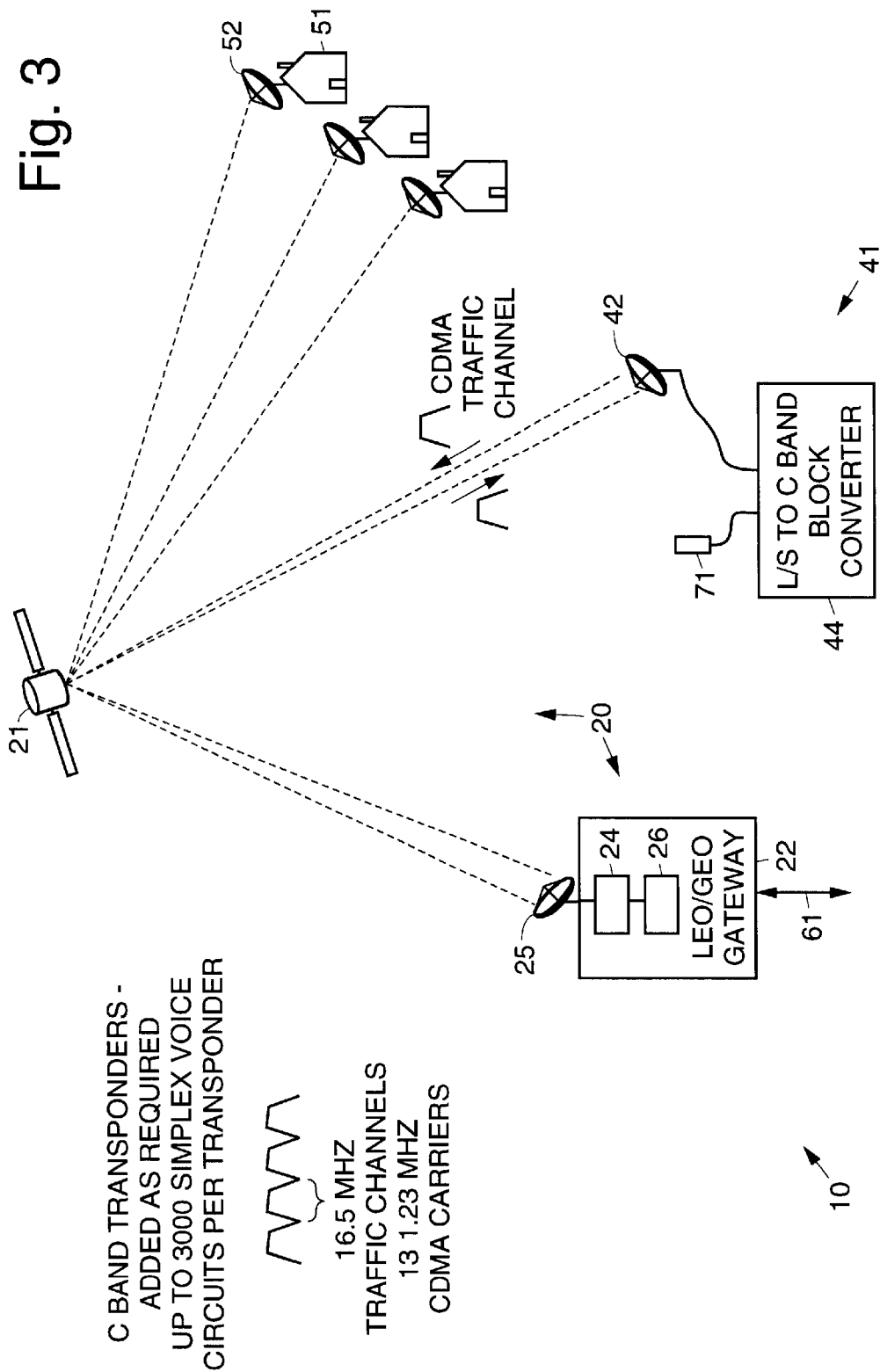
FIG. 3 illustrates an exemplary interface between a user terminal and a LEO/GEO gateway in accordance with the principles of the present invention.
Figure 4:
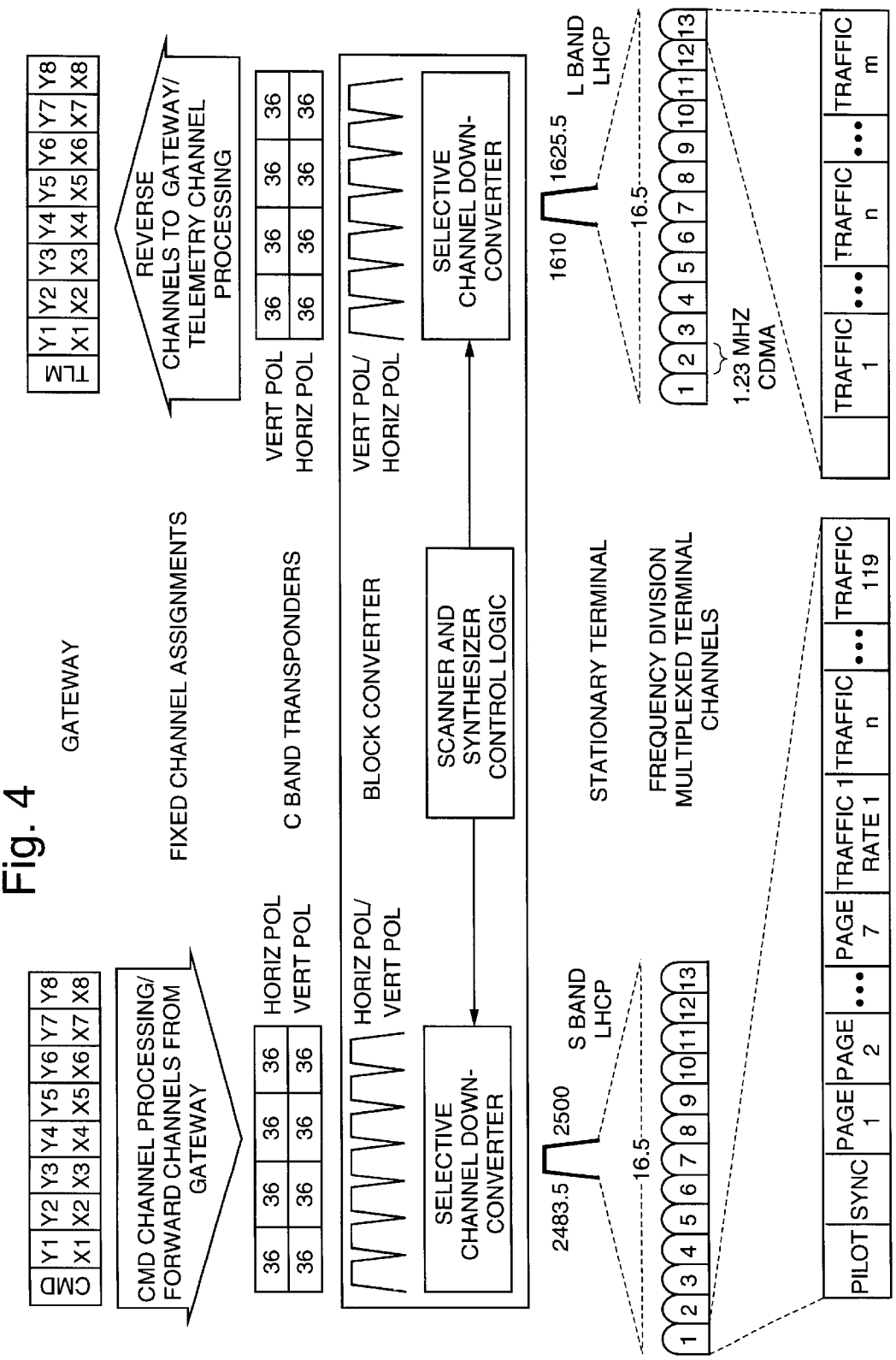
FIG. 4 illustrates an exemplary terminal overlay for the hybrid network architecture.

Referring now to FIG. 2, it illustrates an exemplary complementary communications network architecture 10 in accordance with the principles of the present invention. The exemplary complementary communications network architecture 10 is configured in a manner substantially similar to the architecture 10 shown in FIG. 1. However, the LEO/GEO gateway 22 used in the hybrid network architecture 10 is not employed. Instead, the complementary communications network architecture 10 employs a standard GEO gateway Additional key aspects of the communications network architectures 10 shown in FIGS. 1 and 2 are discussed with reference to FIGS. 3 and 4. Referring now to FIG. 3, it illustrates an exemplary interface between a fixed terminal 41 and the LEO/GEO gateway 22. FIG. 4 illustrates an exemplary terminal overlay for the network architectures 10.

As is shown in FIGS. 3 and 4, one possible implementation of the C-band terminal 24 in the LEO/GEO gateway 22 comprises C-band transponders that process 16.5 MHz traffic channels comprising thirteen (13) 1.23 MHz CDMA carriers. Each C-band transponder provides up to 3000 simplex voice circuits at 2.4 kbps. The traffic channels comprising the CDMA carriers are uplinked to the transponders 27 in the geosynchronous communications satellite 21, which in turn downlinks them to selected fixed terminals 41 located at the low telephone density sites 40 and clustered village phone systems 50. The LEO/GEO gateway 22 has an interface at S- and L-band to the C-band terminal 24 which is the complement of the interface for the handset 71 of each fixed and mobile terminal 41, 72.

The fixed terminals 41 located at the low telephone density sites 40 and clustered village phone systems 50 include a C-band to L- and S- band block converter 44. The block converter 44 is used to convert C-band signals transmitted by way of the geosynchronous communications satellite 21 into S-band signals processed by the fixed and mobile terminals 41, 72. The block converter 44 is also used to convert L-band signals output by the fixed and mobile terminals 41, 72 into C-band signals that are uplinked to the geosynchronous communications satellite 21 for transmission to the LEO/GEO gateway 22. Thus, it is possible to utilize similar satellite channel access means and terminal technology across both LEO and GEO systems.

The low earth orbit gateway 31 also communicates by way of the low earth orbit communications satellites 31 to low telephone density sites 40 and clustered village phone systems 50. The low earth orbit satellite communications system 20 also has mobile terminals 72 that are used to communicate from vehicles. The mobile terminals 72 interface to the low earth orbit communications satellites 31 or to cellular sites 75 in high telephone density areas 60. Thus, the mobile terminals 72 may be used in both low and high telephone density areas 40, 60. The mobile terminals 72 interface by way of the cellular sites 75 to the public switch telephone network.

Each communication site in the low telephone density areas 40 has a terminal 41 and a public use handset 71 that are used to communicate with the geosynchronous communications satellite 21 and the low earth orbit communications satellites 31. Each clustered village phone system 50 has a very small aperture terminal 51 (and VAST antenna 52) that is coupled to either a wired or wireless loop 53 interconnecting a plurality of conventional telephones. The very small aperture terminal 51 may also be coupled to a public use handset 71 for backup purposes, in case of failure of the wired or wireless loops 53.

The CDMA technology used in the hybrid network architectures 10 is based upon the IS-95 CDMA standard to provide high-quality, digital voice, data, messaging and fax services. The IS-95 CDMA standard uses digital transmission methods in which users share time and frequency allocations and are assigned by unique assigned codes. The signals are separated at the terminals 41, 51, 37, 72 by using a correlator that accepts only signal energy from the desired circuit. Undesired signals are ignored as noise. The IS-95 CDMA technology allows a large number of wireless users simultaneously to access a single radio frequency channel orthogonally, thus reducing interference. This results in a manyfold increase in capacity when compared to analog systems, such as frequency division multiple access (FDMA) systems.

It is to be understood that the code division multiple access (CDMA) technology used in the exemplary architectures 10 is only one of many possible technologies that may be employed. Other possible system technologies include third generation mobile phone systems (sometimes referred to as 3G) now under development, frequency division multiplexed (FDM), time division multiple access (TDMA), and multi-frequency time division multiple access (MF-TDMA) technologies.

In operation, a call made via a user terminal 41, 51, 72 will first attempt to connect through the existing local cellular sites 75, and failing that, via the geosynchronous satellite system 20 or the low earth orbit satellite system 30. The call is then relayed via satellite 21, 31 down to the respective gateway 22, 32, which then routes the call through the PST or PLMN system to its end destination. Thus, the network architectures 10 act as an extension of existing land-based systems. This minimizes capitalization costs required to interface (at the gateway 22, 32) to the PST or PLMN systems. The user terminals 41, 51, 72 are dual- or multi-mode terminals, and are compatible with other access standards such as AMPS, IS-95, and GSM protocols, for example.

FIGS. 3 and 4 illustrate several key innovative features provided by the present invention. The present invention allows communications signals generated using the low earth orbit communication system 30 to be communicated between the LEO/GEO gateway 22 and the fixed terminals 41 using the "bent pipe" transmission channel provided by the geosynchronous communications satellite 21. Thus, the geosynchronous communication system 20 is caused to support data transmission having a CDMA or similar structure. The present invention thus interconnects the low earth orbit communication system 30 to the geosynchronous communications system 20.

The block converters employed in the present invention map the low earth orbit CDMA channels into the GEO spectrum for transmission between the GEO satellite and the gateway. Thus, the infrastructure of the low earth orbit communication system 30 is not changed when using the geosynchronous communications system 20.

There are significant benefits derived from using the network architectures 10 including provision of a common CDMA (or similar) platform shared by either LEO or GEO transport. The network architectures 10 has competitive FSS space segment costs and provides for capacity growth for fixed traffic using the FSS band. The network architectures 10 provides a cost effective solution for remote terminals having few voice circuits. The network architectures 10 uses a slightly modified GlobalStar low earth orbit gateway 32 to provide the geostationary gateway 22, which minimizes development and implementation costs.

Thus, low earth orbit, geosynchronous orbit satellite-based communications architectures have been disclosed. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A communications network architecture comprising:
   geosynchronous satellite communications system including a geosynchronous communications satellite;
   a low earth orbit satellite communications system including a plurality of low earth orbit communications satellites;
   a low earth orbit gateway comprising a terminal for communicating with the low orbit communications satellites using multiple access communication channels, and for communicating with a public switch telephone network:
   a geosynchronous gateway comprising a terminal or communicating with the geosynchronous communications satellite by overlaying multiple access communication channels onto fixed channel assignments and transmitting the overlayed channel assignments, and for communicating with the public switch telephone network; and
   a fixed terminal having a handset for selectively communicating with the low earth orbit communications satellite using the multiple access communication channels, and with the geosynchronous communications satellite by extracting the multiple access communication channel from the fixed channel assignments.

2. The architecture recited in claim 1 further comprising:
   a mobile terminal having a hand,or communicating with the low earth orbit communications satellites using the multiple access communication channels, and with cellular sites of a public land mobile network.

3. The architecture recited in claim 2 wherein the mobile terminal interface by way of cellular sites to the public switch telephone network.

4. The architecture recited in claim 1 wherein the multiple access communication channels comprise a plurality of L-band channels and a plurality of S-band channels.

5. The architecture recited in claim 1 wherein the L-band channels are used to communicate from the terminals to the low/earth orbit communications satellites, and the S-band channels are used to communicate from the low earth orbit communications satellites to the terminals.

6. The architecture recited in claim 1 wherein the terminal in the geosynchronous gateway comprises a plurality of transponders that process 16.5 MHz traffic channels comprising thirteen 1.23 MHz code division multiple access (CDMA) carriers.

7. The architecture recited in claim 1 wherein the L-band channels are located between 1610 and 1626.5 MHz, the S-band channels are located between 2483.5 and 2500 MHz, the fixed channel assignments used to communicate between the geosynchronous gateway and the geosynchronous communications satellite are located between 5091 and 5250 MHz, and the fixed channel assignments used to communicate between the geosynchronous communications satellite and the geosynchronous gateway are located between 6873 and 7055 MHz.

8. The architecture recited in claim 1 wherein the fixed terminals comprise a block converter for converting the fixed channel assignments transmitted by way of the geosynchronous communications satellite into multiple access communication channels processed by the terminals, and for converting multiple access communication channels output by the terminals into fixed channel assignments that are uplinked to the geosynchronous communications satellite for transmission to the geosynchronous gateway.

9. The architecture recited in claim 1 further comprising a very small aperture terminal coupled to a wired loop interconnecting a plurality of conventional telephones.

10. The architecture recited in claim 1 further comprising a very small aperture terminal for communicating with the geosynchronous communications satellite using the fixed channel assignments.

11. The architecture recited in claim 10 wherein the very small aperture terminal is coupled to a wireless loop interconnecting a plurality of conventional telephones.

12. The architecture recited in claim 10 wherein the very small aperture terminal is coupled to a public use handset.

* * * * *